Oct. 6, 1970 L. O. FRIEND ET AL 3,533,023

MULTILAYERED CIRCUITRY INTERCONNECTIONS WITH INTEGRAL SHIELDS

Filed Sept. 19, 1967

INVENTORS
LAWRENCE O. FRIEND
KIRK D. THOMPSON
BY
Mueller Aichele & Rauner

United States Patent Office 3,533,023
Patented Oct. 6, 1970

3,533,023

MULTILAYERED CIRCUITRY INTERCONNECTIONS WITH INTEGRAL SHIELDS

Lawrence O. Friend and Kirk D. Thompson, Scottsdale, Ariz., assignors to Motorola, Inc., Franklin Park, Ill., a corporation of Illinois Filed Sept. 19, 1967, Ser. No. 668,771
Int. Cl. H01p *3/08;* H02b *1/04*
U.S. Cl. 333—84 3 Claims

ABSTRACT OF THE DISCLOSURE

Plural striplines each consisting of a signal conductor pattern sandwiched between a pair of insulating layers which in turn are disposed between a pair of ground conductors interconnected as by a transistor, resistor, conductor, or shorted together. Such interconnection means is surrounded by a plurality of rods connected to the ground conductor with the space in between adjacent rods being less than one-fourth the wave length of the design frequency. Connections to the signal conductors from the interconnecting device are by a pliant flap soldered onto the signal conductor and forced against the interconnecting member by an insulating screw or bolt extending through the adjacent insulating member.

The invention herein described was made in the course of or under a contract or subcontract thereunder with the NOTS Facility of the Department of the Navy.

BACKGROUND OF THE INVENTION

This invention relates to stripline high frequency electrical circuit structure and particularly to such structure which facilitates interconnection between superposed striplines.

In electronic equipment designed to operate in a high frequency range, such as frequencies up to and including 10 gHz, a stripline type of interconnection is usually used. Striplines include those constructions having a signal conductor pattern sandwiched between a pair of insulating layers which in turn are sandwiched between a pair of ground conductors. Operation of such striplines and use as transmission lines in devices operating in the microwave region is well known. Some of the problems involved in using such construction are bias circuit isolation and electromagnetic shielding between the various portions of the equipment. Without such shielding, undesirable feedback may have a degrading effect on equipment operation. A factor contributing to such problem is the connection between adjacent striplines that may be superposed one upon the other.

SUMMARY OF THE INVENTION

It is an object of this invention to provide a facile means of interconnecting signal conductors between superposed stripline or multilayered circuits.

It is another object of this invention to provide shielded interconnections for striplines assemblies.

It is a further object of this invention to provide interconnections between superposed microwave striplines which are easily assembly and disassembled for repair.

Apparatus incorporating the teachings of this invention include the features of a plurality of spaced-apart rod shaped ground members disposed around the interconnecting device between two signal conductors of superposed striplines. The spacing between adjacent rod-like ground members is preferably substantially less than one-quarter wave length of the design frequency. Another feature includes the addition of a pliant conductor flap on a signal conductor and which is pressed against the interconnecting device by a screw of insulating material extending through one of the insulating layers. Another feature includes the provisions of inexpensive rod-like ground-like conductors in the form of eyelets which may be pressure fit into the various striplines. Interconnecting devices include diodes, electrical conductors, inductances, and transistors especially of the coaxial type in which one of the electrodes is connected to an annular ring coaxially disposed about the transistor case with the other electrodes rspectivly formed at opposite axial ends of the transistor case. When coaxial transistors are utilized as interconnecting devices, conductive spacers may be placed between adjacent striplines such that there will not be deformation of the stripline once it is assembled.

THE DRAWING

DESCRIPTION OF THE ILLUSTRATIVE EMBODIMENTS

Figure 1:
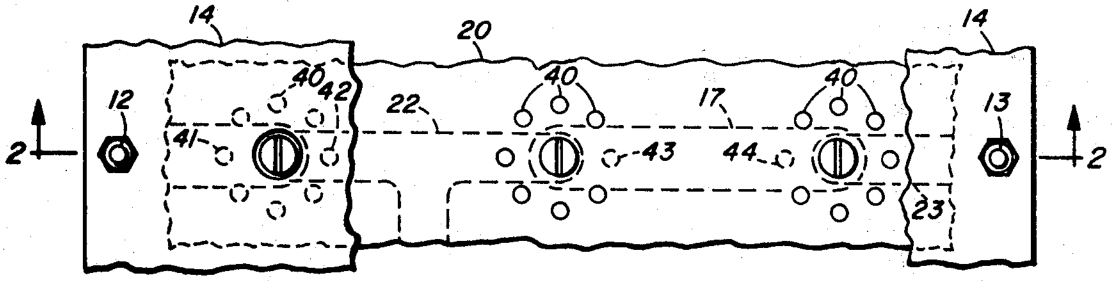
FIG. 1 is an enlarged partial diagrammatic plan view of apparatus incorporating the teaching of this invention.
Figure 2:
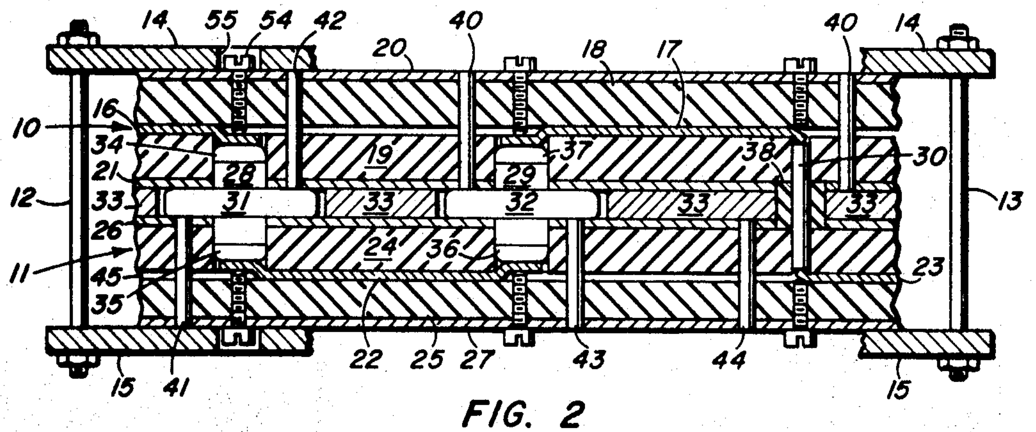
FIG. 2 is an enlarged partial sectional view taken in the direction of the arrows along line 2—2 in FIG. 1 and showing various interconnecting members.

Referring now more particularly to the drawings, like numbers indicate like parts and structural features in the various diagrammatic views. FIGS. 1 and 2 diagrammatically illustrate interconnections of two adjacent superposed stripline assemblies 10 and 11. The striplines are held firmly together by an electrically conductive clamp assembly, including bolts 12 and 13, which urge heavy conductive members 14 and 15 one toward the other to compress assemblies 10 and 11. Stripline assembly 10 includes a signal conductor pattern having separate electrical conductors 16 and 17 sandwiched between a pair of insulating layers 18 and 19 which in turn are sandwiched between ground plane conductors 20 and 21. The signal conductor pattern, including separate conductors 16 and 17, are formed in the usual manner such as is well known in the art. Stripline assembly 11 includes a signal conductor pattern having separate electrical conductors 22 and 23 sandwiched between a pair of insulating layers 24 and 25 which in turn are sandwiched between a pair of ground plane conductors 26 and 27. The physical contact between the members 14 and 15, respectively, with the ground plane conductors 20 and 27 forms a good ground electrical connection therebetween. The signal conductors are interconnected, as will be described, by coaxial transistors 28 and 29 and by electrical device 30. Since the coaxial transistors 28 and 29 have radially outwardly extending flanges 31 and 32 having a thickness which may be quite substantial with respect to the thickness of the ground plane conductors 21 and 26, spacer member 33 is disposed between these ground plane conductors for the purpose of preventing deformation of the assemblies 10 and 11 as well as providing an improved central ground plane consisting of conductors 21 and 26 and conductive spacer 33. Coaxial transistors 28 and 29 have their emitter electrode connected to the radially outwardly extending flanges 31 and 32, respectively, indicating that a ground emitter configuration circuit is provided.

Transistor 28 has its base electrode 34 connected to signal conductor 16 for receiving signals to be transmitted to signal conductor 23. Transistor 28 has its collector electrode 35 connected to signal conductor 22 which supplies signals from transistor 28 to the base electrode 36 of transistor 29. Collector electrode 37 in turn supplies amplified signals to signal conductor 17. Device 30, which may be a wire or other form of highly conductive material, a coupling capacitor of coaxial design, or an inductance, for example, supplies signals from conductor 17 to conductor 23 which is the output circuit. It should be noted that the signal conductors 16 and 17 are shielded from signal conductors 22 and 23 by the central ground plane. As shown, device 30 may be insulated from the central ground plane by an insulating washer 38.

The electromagnetic shielding provided by the illustrated structure in the interconnections afforded by transistors 28 and 29 and device 30 is provided by a plurality of spaced-apart circumferentially disposed electrically conductive eyelets or rod-shaped ground members generally designated 40. Rod-shaped ground conductors 40 are circumferentially disposed around the devices 28, 29 and 30 except where the signal conductors make connections thereto. For example, signal conductor 16 makes electrical connection to base electrode 34 with the ground rod being omitted in that portion of the periphery in which conductor 16 is disposed. Ground rods 40 extend around transistor 28 except where conductor 16 is disposed in assembly 10 and where conductor 22 extends oppositely in assembly 11. For example, in FIG. 1 dotted circle 41 corresponds to a single one of the ground rods 40 in assembly 11 directly under conductor 16, whereas in assembly 10 rod 42 is disposed as shown, aligned with signal conductor 22, with no ground rod 40 extending in this position in assembly 11. The same is true for the other interconnecting devices 29 and 30 wherein the respective dotted circles 43 and 44 represent omitted rods for permitting signal conductor connections to the respective devices. Therefore, the various ground conductor rods are formed as oppositely opening partial circular configurations around the various interconnecting devices with the oppositely facing openings receiving the respective electrical signal conductors. It is to be understood that the openings for receiving signal conductors may be on the same side such that, for example, the signal conductor 16 would supply signals to base electrode 34 and, in turn, collector electrode 35, instead of supplying signals to signal conductor 22, would supply a signal to a conductor (not shown) disposed in space 45 between insulating layer 24 and 25 as best seen in FIG. 2.

Figure 3:
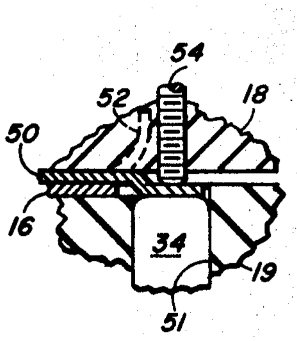
FIG. 3 is a greatly enlarged diagrammatic view of the electrical connection between a signal conductor and an interconnecting device.

Referring next to FIG. 3, the electrical connection from signal conductor 16 disposed between insulating layers 18 and 19 to base electrode 34 is shown in an enlarged diagrammatic form. A thin pliant copper flap 50 is soldered or otherwise bonded to conductor 16 and extends over aperture 51 formed in insulating layer 19. Flap 50 is sufficiently pliant to permit flexure to dotted line position 52. However, in assembly, the transistor 28 case is first inserted in the corresponding and aligned aperture of layer 24 (FIG. 2); spacers 33 inserted; and then assembly 10 is fitted over the base electrode 34. For providing manufacturing tolerances the axial length of transistor 28 is made less than the distance between conductors 16 and 22, as best seen in FIG. 2. Therefore, flap 50 does not make contact with base electrode 34 unless insulating screw 54 is threadingly disposed through insulating layer 18 and pressed against flap 50 forcing it into good mechanical and electrical connection with base electrode 34. To facilitate assembly and ensure that good electrical connection is maintained, aperture 55 is formed in member 14, as seen in FIG. 2. The electrical connections between the other signal conductors and the other described and illustrated interconnecting devices are made in a similar manner.

Figure 4:
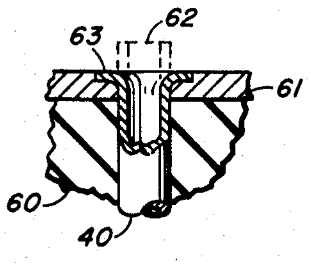
FIG. 4 is a greatly enlarged partial sectional view of an eyelet member connected to a ground conductor.

Referring next to FIG. 4, the connection of eyelets or rod-shaped ground conductors 40 to a ground plane conductor is illustrated. The eyelet 40 is formed as a tubular conductive member of deformable copper and disposed in insulating layer 60 having ground plane conductor 61 thereon. After insertion, the tubular member 40 extends up above ground plane conductor 61 as indicated by dotted line 62. A tool (not shown) is then pressed against the axial end of member 40 causing it to flare out forming end portion 63 in the manner of a known eyelet or rivet.

Figure 5:
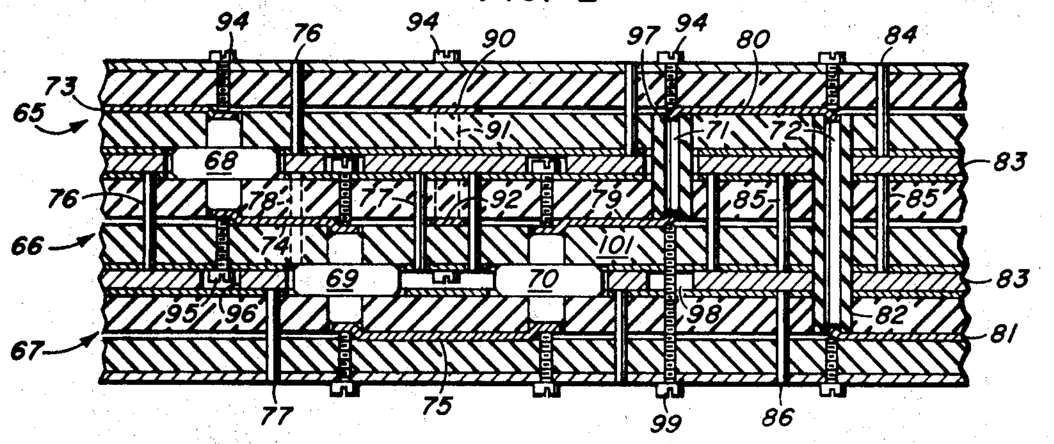
FIG. 5 is a diagrammatic sectional view of three striplines superposed one on the other showing various shielded electrical interconnections.

Referring next to FIG. 5, various interconnections between three superposed stripline assemblies 65, 66, and 67 are shown. Various interconnecting devices, including coaxial transistors 68, 69, and 70, resistor 71, and conductor 72, electrically interconnect the various three assemblies together. The input signal is supplied over input signal conductor 73 in assembly 65. Coaxial transistor in the grounded emitter configuration supplies the signal over conductor 74 to transistor 69 which in turn supplies it over conductor 75 to transistor 70. The ground rod configuration consisting of a plurality of rods 76 about transistor 68 are formed as described with respect to FIG. 1, as to the ground rods 77 disposed about transistor 69. It may be noted that transistors 68 and 69 are spaced quite closely together such that one of the ground rods 78, indicated in dotted line form, serves as a ground rod shield for both transistors 68 and 69.

Transistor 70 in turn supplies signals over conductor 79 to resistor 71 which then in turn supplies signals over conductor 80 through transfer interconnecting conductor 72 from stripline assembly 65 to output conductor 81 of assembly 67. It may be noted that stripline assembly 66 is bypassed by conductor 72 because of insulating tubular member 82. A plurality of ground spacers 83 are respectively provided between the three striplines 65, 66, and 67. All of the connections are shielded by a plurality of spaced-apart ground rods. Referring to the right-hand portion of FIG. 5, it is seen that conductor 72 is shielded in stripline 65 by plurality of rods 84 and in stripline assembly 66 by plurality of rods 85. In the latter, rods 85 form a complete circle around conductor 72 for providing good electromagnetic radiation shielding from that stripline. Plurality of conductive rods 86 shield the connection from conductor 72 in stripline 67.

While the views have diagrammatically shown connections running along one line as best seen in FIG. 1, it is to be understood that a grid pattern of circuit connections is providable by this assembly. For example, in FIG. 5 conductor 90 in stripline 65 is extending transverse to the conductors 73 and 80 in that same stripline. An electrical device 91 (indicated by dotted lines) connects transversely extending conductor 90 to another transversely extending conductor 92 in stripline 66. For clarity, the shielding ground rods are not shown for these latter connections. In all instances opposed threaded insulating screws collectively designated by the numeral 94 press pliant conductor flaps from the respective signal conductors against the various interconnecting devices. It may be noted that the insulating screw 95 has its kerfed head between striplines 66 and 67 in an aperture with ground spacer 83. An elongated insulating screw 99 is exposed through an enlarged aperture in stripline 67 and is threadingly engaged to insulating layer 101 of stripline 66 to force conductor 79 against end portion 97. In this manner the flap is made connectable to resistor 71 after the entire assembly has been assembled. Alternately, layer 101 may have an enlarged aperture with the threaded engagement of elongated insulating screw 99 being made with stripline 67.

What is claimed is:

1. A high frequency circuit structure of the type wherein an active semiconductor element is connected between the center conductor of superposed stripline assemblies, comprising in combination:

a first stripline assembly having a first center conductor pattern sandwiched between two adjacent insulating layers, said insulating layers being sandwiched between two ground conductors;

a second stripline assembly having a second center conductor pattern sandwiched between two adjacent insulating layers, said insulating layers being sandwiched between two ground conductors;

an active semiconductor element having a coaxial configuration, said element having first and second coaxial electrodes and a radially outwardly extending flange therebetween, said flange having a predetermined axial thickness;

a conductive spacer means disposed between and in contact with adjacent ground planes of the superposed first and second stripline assemblies, said spacer means having a thickness equal to the thickness of said radially extending flange, said spacer means having an aperture therein for receiving said radially extending flange of the active semiconductor element;

first and second apertures formed in the first and second stripline assemblies respectively adjacent said spacer means, each of said first and second apertures being formed in a ground plane and adjacent insulating layer and being adapted to receive the first and second coaxial electrodes of said active semiconductor assembly, said apertures being radially smaller than the radially extending flange of the active semiconductor element;

a plurality of rod-like conductive members extending through each of the stripline assemblies peripherally about and spaced from said active element and electrically joining the two ground plane conductors of each semiconductor assembly, adjacent conductive members being spaced apart less than one-quarter wavelength of a design frequency substantially around said active element;

means for clamping said first and second stripline assemblies in superposed relationship with said first and second apertures being coaxially aligned, the ground planes adjacent said spacer means contacting the radially extending flange of said active element to form a central ground plane and provide shielding between the center conductor of the first and second stripline conductors; and insulating means extending through the outer ground plane and adjacent insulating layer of each of said stripline assemblies, said insulating means contacting the center conductor of an assembly and urging said center conductor into electrical contact with the corresponding coaxial electrode of the active semiconductor element.

2. The structure in accordance with claim 1 wherein the center conductor patterns of each stripline assembly are provided with a pliant flap of conductive material located to extend over the coaxial electrode of the active semiconductor element, said pliant flap being in contact with said insulating means and urged thereby into electrical contact with the corresponding electrode of the active element.

3. The structure in accordance with claim 2 wherein the insulating means comprises insulating screws coaxially aligned with said first and second apertures and threadingly engaging the corresponding stripline assembly.

References Cited

UNITED STATES PATENTS

| | | | |
|---|---|---|---|
| 2,938,175 | 5/1960 | Sommers. | |
| 3,142,783 | 7/1964 | Warren. | |
| 3,142,808 | 7/1964 | Gonda. | |
| 3,150,336 | 9/1964 | Gonda. | |
| 3,155,881 | 11/1964 | St. Jean. | |
| 3,218,584 | 11/1965 | Ayer | 317—234 |
| 3,225,272 | 12/1965 | Cronemeyer | 307—299 |
| 3,303,439 | 2/1967 | Fulp. | |
| 3,308,352 | 3/1967 | Hutchins et al. | |

FOREIGN PATENTS

| | | |
|---|---|---|
| 631,307 | 11/1961 | Canada. |

HERMAN K. SAALBACH, Primary Examiner

W. N. PUNTER, Assistant Examiner

U.S. Cl. X.R.

317—101